UNITED STATES PATENT OFFICE.

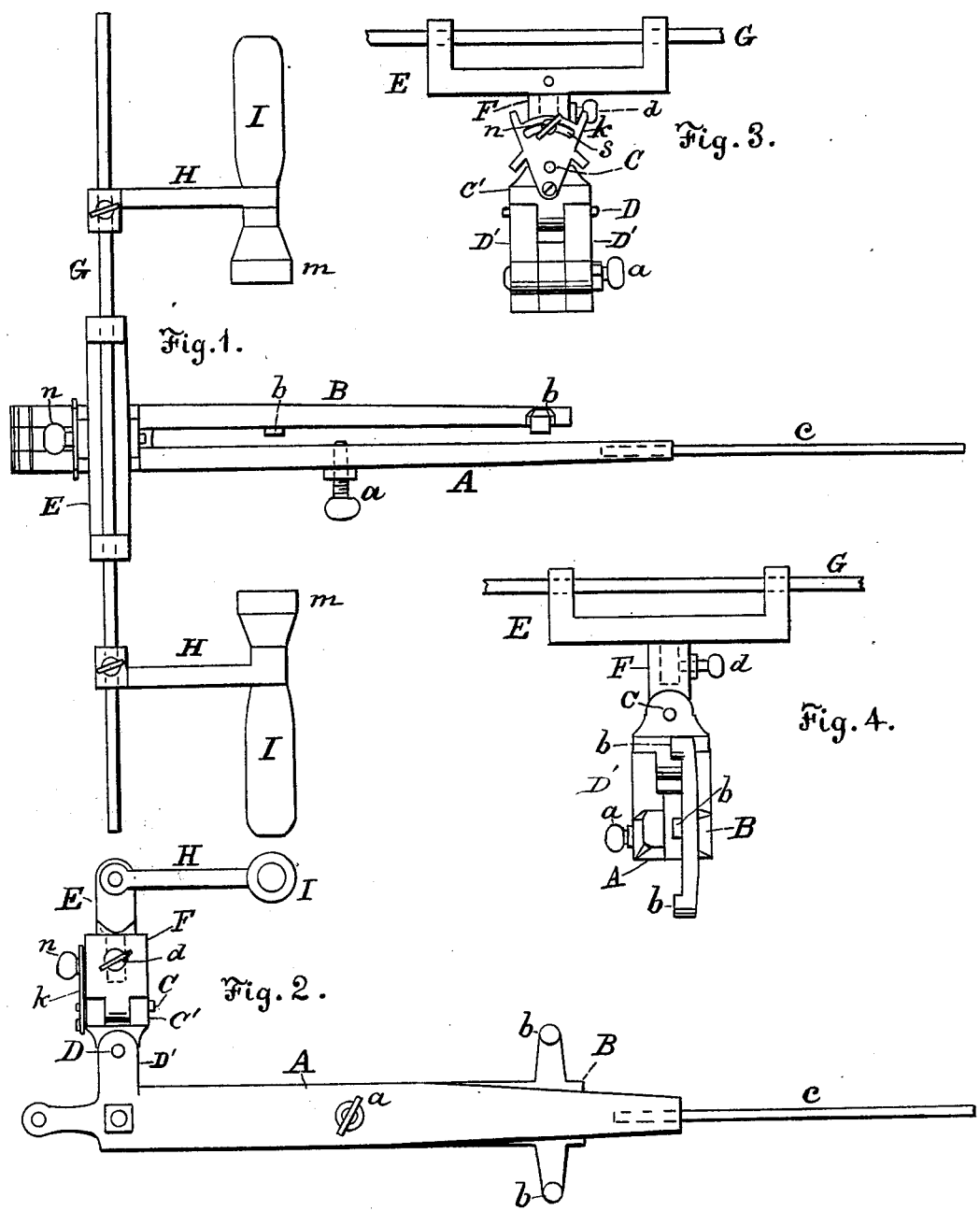

RANSFORD W. BASOM, OF LONGVIEW, TEXAS.

IMPROVEMENT IN MACHINES FOR FILING SAWS.

Specification forming part of Letters Patent No. 218,656, dated August 19, 1879; application filed August 28, 1878.

*To all whom it may concern:*

Be it known that I, RANSFORD W. BASOM, of Longview, in the county of Gregg and State of Texas, have invented certain new and useful Improvements in Machines for Filing Saws; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to machines for filing saws; and consists in certain improvements in the construction of the same, as hereinafter shown and described.

In the accompanying drawings, forming a part of this specification, Figure 1 is a plan view of my improved saw-filing machine. Fig. 2 is a side view of the same. Fig. 3 is a rear view, and Fig. 4 is a front view.

My machine is constructed to be secured to the saw to be filed, and to be operated by hand, the machine being adjustable to a circular or other kind of saw.

A and B designate two parallel arms, which are formed to close at the outer ends, where the file-holding apparatus is supported. The arm A, being somewhat longer than B, is provided with a thumb-screw, $a$, and a removable rod, $c$; and the arm B, being somewhat branching, as shown, is provided with studs $b$, it being intended, when the machine is used on a circular saw, to place it so that the arms A and B extend each side of the saw, with the rod $c$ resting on the collar of the same, and then clamp it sufficiently, by means of the screw $a$, so as to allow the operator to slide the machine on the saw as it becomes necessary.

That part of the machine which supports the file-holder is provided with the hinges C and D, moving at right angles with each other, so that the cross-head E at the top may be inclined forward or sidewise, as desired. The cross-head E has also a pivotal movement, the part F being somewhat tubular and provided with a thumb-screw, $d$, so that F receives a small shaft or bolt projecting downward from the cross-head, and the latter may be fixed in position by turning the screw $d$.

The horizontal rod G is held by the cross-head E, so that the said rod is allowed a sliding movement. To the rod G are adjustably secured the arms H, which hold the handles I, provided with sockets $m$, to receive the extremities of the file. The arms H, as will be seen, may be fixed at any points on the rod G, so as to receive a file of any length.

The required lateral inclination of the cross-head E is adjusted and fixed by means of the slotted plate $k$ and the thumb-screw $n$, these parts together forming a clamp.

The vertical continuations D' of the arms A and B are hinged to the part C', so that the latter may be moved or inclined in the direction of the said arms, while the part C' is hinged to the part F, in which the cross-head is seated, so that the part F has a lateral movement, the hinges being at right angles to each other. The said plate $k$ has a fixed connection with the part C' and an adjustable connection with the part F by means of the screw $n$ passing through the slot $s$, as shown.

I claim—

The vertical continuation of the arms A and B, hinged to the part C', the latter being hinged to the part F, and the hinges being at right angles with each other, as shown, in combination with the plate $k$, carried by the part C', and having the slot $s$ and the thumb-screw $n$, to adjust the inclination of the part F, in which the cross-head E is seated, as herein specified.

In testimony that I claim the foregoing as my own I affix my signature in presence of two witnesses.

RANSFORD W. BASOM.

Witnesses:
   J. S. LACY,
   J. W. FLANAGAN.